US009011693B2

(12) United States Patent
Vero et al.

(10) Patent No.: US 9,011,693 B2
(45) Date of Patent: Apr. 21, 2015

(54) WATER POLISHING PROCESS

(75) Inventors: Gregory Mark Vero, Camberwell (AU); Anthony Price, Mouldsworth (GB); Colin Bruce Ritchie, Nar Nar Goon (AU)

(73) Assignee: Orica Australia Pty Ltd, Melbourne (AU)

( * ) Notice: Subject to any disclaimer, the term of this patent is extended or adjusted under 35 U.S.C. 154(b) by 1696 days.

(21) Appl. No.: 11/721,428

(22) PCT Filed: Dec. 15, 2005

(86) PCT No.: PCT/AU2005/001902
§ 371 (c)(1), (2), (4) Date: Sep. 20, 2007

(87) PCT Pub. No.: WO2006/063406
PCT Pub. Date: Jun. 22, 2006

(65) Prior Publication Data
US 2009/0236287 A1 Sep. 24, 2009

Related U.S. Application Data

(60) Provisional application No. 60/636,221, filed on Dec. 15, 2004.

(51) Int. Cl.
| | | |
|---|---|---|
| *B03C 1/02* | (2006.01) | |
| *B03C 1/30* | (2006.01) | |
| *C02F 1/42* | (2006.01) | |
| *C02F 1/48* | (2006.01) | |
| *B01J 47/00* | (2006.01) | |
| *B01J 20/28* | (2006.01) | |
| *B01J 47/10* | (2006.01) | |
| *B01J 49/00* | (2006.01) | |
| *B03C 1/28* | (2006.01) | |

(52) U.S. Cl.
CPC .......... *B01J 47/006* (2013.01); *B01J 20/28009* (2013.01); *B01J 47/10* (2013.01); *B01J 49/00* (2013.01); *B03C 1/286* (2013.01); *C02F 1/42* (2013.01); *C02F 1/488* (2013.01)

(58) Field of Classification Search
USPC ................. 210/676, 222, 223, 675, 679, 695; 209/217, 223.1, 229
See application file for complete search history.

(56) References Cited

U.S. PATENT DOCUMENTS 293,745 A * 2/1884 Hyatt ........................... 210/290
2,125,846 A   8/1938 Laughlin
(Continued)

FOREIGN PATENT DOCUMENTS

| EP | 0 522 856 | 1/1993 |
|---|---|---|
| GB | 910476 | 11/1959 |

(Continued)

OTHER PUBLICATIONS

Definition of "magnetic", Merriam-Webster Online Dictionary, Accessed Feb. 23, 2011, pp. 1-3.*
(Continued)

*Primary Examiner* — David C Mellon
(74) *Attorney, Agent, or Firm* — Lathrop & Gage LLP

(57) ABSTRACT

The invention provides a process for separating a solution from magnetic resin portions, particles and/or fines by passing a solution containing the resin portions, particles and/or fines through a bed of particulate magnetic material.

20 Claims, 1 Drawing Sheet

(56) References Cited

U.S. PATENT DOCUMENTS

| | | | |
|---|---|---|---|
| 2,642,514 A | | 6/1953 | Herkenhoff et al. |
| 3,143,496 A | | 8/1964 | Maretzo |
| 3,437,207 A | * | 4/1969 | Fejes .................... 210/287 |
| 3,560,378 A | | 2/1971 | Weiss et al. |
| 3,887,457 A | * | 6/1975 | Marston et al. .......... 209/214 |
| 4,039,447 A | | 8/1977 | Miura et al. |
| 4,284,511 A | | 8/1981 | Weitzen et al. |
| 4,314,905 A | | 2/1982 | Etzel et al. |
| 4,523,996 A | | 6/1985 | Charles et al. |
| 4,643,822 A | | 2/1987 | Parsonage |
| 4,735,725 A | | 4/1988 | Reuschl et al. |
| 4,921,597 A | | 5/1990 | Lurie |
| 4,981,593 A | | 1/1991 | Priestley et al. |
| 5,110,624 A | | 5/1992 | Noble et al. |
| 5,116,511 A | | 5/1992 | Green et al. |
| 5,230,805 A | | 7/1993 | Yates et al. |
| 5,298,179 A | | 3/1994 | Ukita et al. |
| 5,310,486 A | | 5/1994 | Green et al. |
| 5,397,476 A | | 3/1995 | Bradbury et al. |
| 5,476,591 A | | 12/1995 | Green |
| 5,628,900 A | | 5/1997 | Naito |
| 5,772,877 A | | 6/1998 | Dvorchik et al. |
| 5,855,790 A | | 1/1999 | Bradbury et al. |
| 5,900,146 A | | 5/1999 | Ballard et al. |
| 5,944,986 A | | 8/1999 | Saho et al. |
| 6,077,333 A | | 6/2000 | Wolfs |
| 6,099,738 A | | 8/2000 | Wechsler et al. |
| 6,171,489 B1 | | 1/2001 | Ballard et al. |
| 6,416,668 B1 | | 7/2002 | Al-Samadi |
| 6,669,849 B1 | | 12/2003 | Nguyen et al. |
| 7,291,272 B2 | | 11/2007 | Bourke et al. |
| 7,785,474 B2 | | 8/2010 | Vero et al. |
| 8,623,216 B2 | | 1/2014 | Vero et al. |
| 2004/0035760 A1 | | 2/2004 | Alford et al. |
| 2005/0126975 A1 | * | 6/2005 | Naito .................... 210/222 |
| 2005/0274674 A1 | | 12/2005 | Mueller et al. |
| 2009/0242487 A1 | | 10/2009 | Vero et al. |
| 2009/0277834 A1 | | 11/2009 | Vero et al. |
| 2013/0056421 A1 | | 3/2013 | Vero et al. |

FOREIGN PATENT DOCUMENTS

| | | |
|---|---|---|
| GB | 822856 | 11/1962 |
| GB | 1029084 | 5/1966 |
| JP | 53005090 A | 1/1978 |
| JP | 56013039 | 2/1981 |
| JP | 59147611 | 8/1984 |
| JP | 60097087 | 5/1985 |
| JP | 7232160 | 9/1995 |
| JP | 9248561 | 9/1997 |
| WO | WO93/08919 | 5/1993 |
| WO | WO 93/08919 | 5/1993 |
| WO | WO 93/21114 | 10/1993 |
| WO | WO93/21114 | 10/1993 |
| WO | WO 01/78863 | 10/2001 |
| WO | WO01/78863 | 10/2001 |
| WO | WO02/088027 | 11/2002 |
| WO | WO 02/088027 | 11/2002 |
| WO | PCT/AU2004/000432 | 10/2004 |
| WO | WO2004/087586 | 10/2004 |
| WO | PCT/AU2005/000419 | 9/2005 |
| WO | WO2005/090458 | 9/2005 |
| WO | PCT/AU2005/000618 | 11/2005 |
| WO | WO2005/105677 | 11/2005 |
| WO | PCT/AU2005/001111 | 2/2006 |
| WO | WO2006/010216 | 2/2006 |
| WO | PCT/AU2005/001426 | 3/2006 |
| WO | WO2006/029478 | 3/2006 |
| WO | WO 2006/063404 | 6/2006 |
| WO | WO 2006/063405 | 6/2006 |
| WO | WO2006/063405 | 6/2006 |
| WO | WO2006/063406 | 6/2006 |

OTHER PUBLICATIONS

English Translation of JP 53005090 A, Translation Dated Jan. 2011.

* cited by examiner

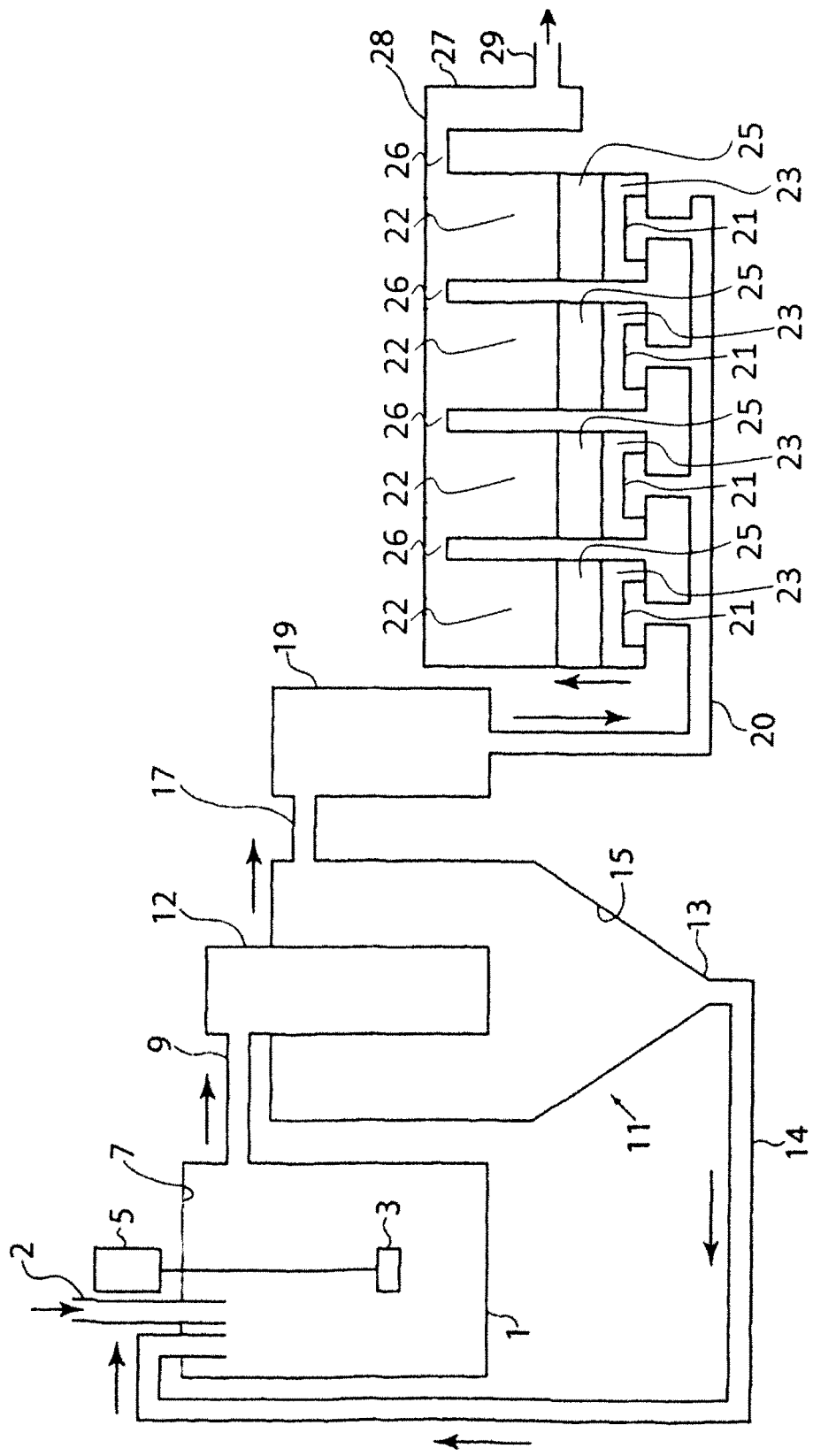

WATER POLISHING PROCESS

CROSS-REFERENCE TO RELATED APPLICATIONS

This application is the United States National Stage application under 35 U.S.C. §371 of International Application No. PCT/AU2005/001902, filed Dec. 15, 2005, which claims the benefit of U.S. Provisional Patent Application 60/636,221, filed Dec. 15, 2004, both of which are hereby incorporated by reference to the extent not inconsistent with the disclosure herewith.

FIELD OF THE INVENTION

The present invention relates to water polishing processes for the removal of magnetic resin fines and fragments of resin from water and other fluid streams, with particular reference to potable water, effluent, sewerage and other water polishing systems, and water treatment processes incorporating the removal process.

BACKGROUND

Magnetic ion exchange resins have been used to remove various compounds from water supplies and waste streams. The resins are used to remove and concentrate a compound or compounds from a stream and move the compound into another stream. The term "compound" includes chemical compounds, elements and ions.

Ion exchange resins work by having functional groups incorporated within a polymer backbone which bind to compounds present within a solution to be treated. The functional groups can be selected so to provide binding sites suitable for binding to various types of compounds present within a solution. Weak acid cationic ion exchange resins are suitable for separating transition metal ions. Acidic organic materials, such as DOC and other negatively charged ions, will bind to anion ion exchange resins. The binding effectiveness of the resin decreases as the compounds use up available binding sites on the resin. The spent resin is regenerated by applying a regenerate wash solution to the resin to reform the binding sites. Treatment with a regenerant solution produces a wash solution containing the separated compounds.

For ease of handling traditional ion exchange resins are contained within columns and the solution to be treated is pumped through the column. This restricts the types of processes in which the resin can be used.

Magnetic ion exchange resins are a significant improvement over traditional ion exchange resins. These resins have a discrete magnetic core or have magnetic particles dispersed throughout the resin. MIEX® brand resin from Orica Australia Pty Ltd is a magnetic ion exchange resin having magnetic particles dispersed throughout the resin and is particularly suitable for use in removing dissolved organic carbon (DOC) from potable water supplies. It has an advantage over other types of magnetic resins as all parts of the resin contain magnetic particles.

As described in U.S. Pat. No. 6,669,849 magnetic ion exchange resins can be used in the treatment of potable water supplies to remove dissolved organic compounds and are referred to as dissolved organic carbon (DOC). It can be used as part of a multi-step treatment process and can provide a number of benefits in addition to the direct removal of DOC. For example some water treatment processes employ activated carbon as a final polishing treatment to alleviate problems with taste and/or odour, to remove disinfection by-products or to remove any other pollutants. Pre-treatment with MIEX resin may also extend the effective life of the activated carbon.

Magnetic ion exchange resin can also be used in the treatment of waste streams. For example the Kraft process produces a highly coloured black effluent which is often released into water ways. Resin may be used to remove the colouring compounds from the effluent waste stream. Resin can also be used to remove and concentrate heavy metals from waste or product streams for recovery or additional processing.

A benefit of using magnetic ion exchange resins is that the weak magnetic properties of the resin allow the resin particles or beads to agglomerate together and quickly settle in settling tanks. This can facilitate the separation of resin from solution and thereby improve the methods of removing, recycling and regenerating resin. This has removed the need for columns to contain the resin and has permitted new treatment arrangements and methods for regenerating the resin, and continuous flow systems.

A number of magnetic separation systems exist but are used to separate different types of particles from associated types of fluid streams.

Processes for the use and separation of whole resin beads for use in the treatment of potable water are known and some have been described in U.S. Pat. No. 6,669,849. Magnetic ion exchange resins are described in U.S. Pat. Nos. 5,900,146 and 6,171,489. Other applications and patents relating to magnetic resins include International Application Nos. PCT/AU2005/001111, PCT/AU2005/000419, PCT/AU2004/000432, PCT/AU2005/000618, PCT/AU2005/001426 and U.S. application Ser. No. 11/124,624. The contents of these documents are incorporated by cross-reference.

There are a number of known methods for separating the magnetic ion exchange resins from solutions. Settling tanks and tube settlers are disclosed in U.S. Pat. No. 6,669,849. Such tanks take up a large amount of space and can significantly increase the capital cost of using a magnetic ion exchange resin. The effectiveness of various existing systems can significantly decrease at higher solution flow rates and with smaller particles.

U.S. Pat. Nos. 5,397,476 and 5,855,790 (Bradtec Limited) relate to a method of removing pollutant ions by using magnetic resins. The magnetic resins are removed by magnetic filtration from the solution. The method of magnetic filtration is not specifically described.

One of the problems with the use of ion exchange resins in mobile resin systems is the damage done to the resin and the associated formation of resin fines and larger particles and fragments or portions of resin beads. These fines, portions and particles may be the product of physical interactions between resin beads themselves or resin beads and the surfaces in contactor, settler or regeneration vessels, mixing blades, pumps or other equipment used in the treatment plant. The interactions damage individual resin beads and produce smaller fragments. Systems designed for separating and recycling the larger resin beads from the treated fluids may not effectively work for the removal of the smaller resin fines, portions or particles.

A solution to this problem is the use of membrane filtration or other filtration systems. However, such systems can be costly to set up, operate and maintain, particularly in a continuous flow water treatment plant.

It would be advantageous to provide an alternative and effective method for separating fines, portions and particles of magnetic resin from a fluid stream. Ideally, the method can work at moderate to high stream flow rates.

BRIEF DESCRIPTION OF THE INVENTION

The invention is predicated on the use of a bed of particulate magnetic material to separate magnetic resin fines from a stream containing the magnetic resin fines.

It has now been found that by passing a stream containing magnetic resin portions, particles and/or fines through a column of particulate magnetic material, such as magnetite, it is possible to remove most if not all of the bits of magnetic resin remaining in the stream after using a conventional (MIEX® or other) resin separation process or a high rate separation process. This can allow the conventional or high rate resin separation processes to be operated at higher flow rates than those calculated for normal operation. High flow rate separation processes can increase the damage done to resin beads and therefore increase the amount of particles and portions of resin remaining in the separated water after using conventional resin collection systems. The present invention can be used to provide a water polisher, for the removal of residual bits of magnetic resin (including portions and particles thereof) from a stream of separated water, or to enhance the effectiveness of a resin separator.

Throughout this specification and the claims that follow, magnetic resins include whole resin beads, damaged resin beads, portions, particles and fines of resin separated from resin beads and which contain magnetic material.

In an embodiment of the invention there is a process for separating a solution from magnetic resin portions, particles and/or fines by passing a solution containing the resin portions, particles and/or fines through a bed of particulate magnetic material, preferably magnetite.

By this embodiment, the invention provides a method of removing magnetic resin portions, particles and/or fines from a solution containing the resin portions, particles and/or fines by magnetically capturing the resin portions, particles and fines within a bed of particulate magnetic material whilst allowing the solution to pass through the bed.

Preferably the particulate magnetic material comprises magnetite and has an average particle size between 0.3 to 50 mm.

The particulate nature and particle size of the magnetic material may be important to the working of the invention as it permits the solution to pass through a bed of the material at ordinary flow rates whilst retaining earlier separated fines on the material.

Preferably the bed of particulate magnetic material comprises a first layer of particulate magnetic material having a first average particle size and a second layer of particulate magnetic material of a second average particle size different to the average particle size of the first layer.

Preferably the solution passes through the first layer of the bed before passing through the second layer of the bed, and the second layer has an average particle size less than that of the first layer.

More preferably, the particulate magnetic material of the second layer has an average particle size from 1.5 to 6 mm and the first layer has an average particle size from 6 mm to 10 mm, and is preferably magnetite.

In another embodiment of the invention there is provided the use of a bed of magnetite to separate a solution from magnetic resin portions, particles and/or fines contained within the solution.

Preferably the magnetic resin is magnetic ion exchange resin. More preferably the magnetic properties of the resin exist throughout the resin and not merely at the surface or the core. Most preferably the resin is MIEX® brand resin from Orica Australia Pty Ltd.

In another embodiment of the invention there is provided a method or process of separating magnetic resin portions, particles and/or fines from a stream containing said magnetic resin portions, particles and/or fines by passing the stream through a column of particulate magnetic material, preferably naturally magnetic minerals such as magnetite, to magnetically bind the resin portions, particles and/or fines to the particulate magnetic material whilst allowing the stream to pass through the column.

In an embodiment there is provided a water polisher comprising a tank with an inlet port and an outlet port and particulate magnetic material, preferably naturally magnetic minerals such as magnetite, located between the inlet and outlet ports through which water will flow as it flows from the inlet port to the outlet port.

The water polisher can comprise a column having an inlet port in fluid communication with an outlet port via an intermediate conduit, the conduit having particulate magnetic material therein.

In a further embodiment there is provided a water treatment process comprising contacting raw water with magnetic ion exchange resin in a contactor, separating the contacted water from the resin, and polishing the separated water in accordance with the fines separation process as described above or by passing the water through a water polisher as described above. The resin itself can be separated from the contacted water by using one or more settler tanks or alternative resin separation systems.

Although the particulate material is preferably magnetite, it should be understood that other sources of a magnetic field could be used such as natural magnetic minerals, synthetic magnetic materials, combinations or composites of both. Magnetite is simply a convenient material to work with due to its low cost and high availability.

In addition to the use of other materials having permanent magnetic properties, the magnetic field could be induced or enhanced by the use of an electromagnet. A magnetic field could be induced within coil(s) located within a body of particulate material. However, electromagnets are not favoured due to the ongoing cost for power compared to the use of magnetite.

Although the magnetic material is preferably denser than the solution it is operating in and therefore settles in the solution within a containment tank, it should be understood that particulate magnetic material could be floated within or on top of the tank. The material may itself be buoyant or may be restrained within a buoyant vessel within or on top of the tank and held in place by a screen. The solution could be pumped into the tank, pass through the material and overflow the top of the tank. The resin would be held within the magnetic material and the overflowing polished solution would be collected. The buoyancy property of the vessel may facilitate removal, washing and return of the material to the process.

The magnetic material could also be located within removable mesh container located within the containment column or tank and the mesh container may be removed to facilitate servicing of the contained material before being returned to the column or tank.

The amount of resin portions, particles and/or fines (and also any resin beads which were not earlier separated and recovered) captured by the magnetic material will increase overtime and may be removed from the magnetic particulate material from time to time in order to maintain the effectiveness of the polisher. The portions, particles and fines could be removed by using a wide range of washing systems. In a simple arrangement, the separator would be taken off line and water forced back at a high velocity through the material to free the resin portions, particles and fines from the magnetic material. The freed portions, particles and fines could be collected and appropriately disposed.

Depending on the overall plant design on-line systems could also be used to separate the captured resin materials from the particulate material. For example, a boom arm could spray water down onto and through a layer of magnetite or other particulate magnetic material and cooperating collector could move with the arm beneath the magnetite to collect any separated resin particles. Air sparging can also be used to enhance the effectiveness of any washing.

Although the freed portions, particles and fines could be collected and appropriately disposed, it is also envisaged that in some instances the freed materials could contain beneficial materials which could be separated from the wash solution and used. For example, useful resin beads that had been caught up in the particulate matter could be separated from the wash solution and returned to contactor tanks associated with the treatment process.

Also the wash solution itself could be recovered and reused in future wash cycles. Alternatively the wash solution may simply comprise a treated fluid stream and, after use as a wash solution, may be filtered or otherwise treated to remove at least most of the separated materials with the filtrate returned to the contactors.

Although the particulate magnetic material should remove the resin fines, it may also beneficially co-remove other materials present in the treated stream. The particulate material can act like a sand filter and therefore may trap non-magnetic materials such as plant matter as well as the magnetic resin fines. The presence of non-magnetic solid material can be a significant issue with raw water treatment plants for the treatment of water collected from a dam or similar water source. Solid matter contaminants can be less of an issue with bore or other underground water sources.

BRIEF DESCRIPTION OF THE FIGURES

The invention will now be further described with reference to the following non-limiting examples. All percentages used herein are by weight unless otherwise stated.

FIG. 1 is a schematic diagram of a potable water treatment system which includes a water polisher of the invention. The arrowheads show the direction of the fluid flows.

DETAILED DESCRIPTION OF THE INVENTION

The arrangement depicted in FIG. 1 includes a resin contactor comprising a tank (1), an agitator (3) connected to a motor (5), the tank having an open mouth (7) by which raw water is added to the tank via raw water inlet pipe (2). The arrowheads show the direction of the fluid flows.

The tank is preloaded with MIEX resin and raw water flows into the tank at a substantially constant regulated rate via raw water inlet pipe (2). The tank outlet pipe (9) connects the contactor tank to a 1.2 m$^2$ in diameter settler (11) via the settler inlet pipe (12). A mixture of resin and water flows into the settler from the contactor. Despite the small size of the resin (MIEX® resin has an approximate mean size of 150 microns), it quickly agglomerates and gathers at the base (13) of the settler. The inclined surface (15) further assists in the agglomeration of the resin. Concentrated resin is collected and pumped with a low impact pump (eg an airlift or recessed impeller pump) from an outlet at the base of the settler into the contactor via settler resin return pipe (14).

In a water treatment plant a portion of the collected resin may be subjected to a regeneration process before being returned to the contactors.

Water together with resin fines and any non settled resin beads continuously overflows the settler and is collected and transported via pipe (17) to a buffer tank (19). The amount of 'lost' overflow resin will depend on system design and flow rates and may be in the order of 1 to 4 ppm. It is believed the buffer tank could be omitted in most water-treatment plants. The water together with the magnetic resin fines, portions and particles is pumped via the polishing tank feed pipe (20) through the polishing tank inlet (21) located at the base of the polishing tanks (22).

The depicted system has four 205 liter polishing tanks connected in parallel. The water is pushed through two grades of magnetite, a 100 mm bed (23) having an average particle size of 6 to 10 mm, followed by a 200 mm bed (25) having an average particle size of 1.5 to 6 mm. The polished water overflows the upper rims of the polishing tanks into the interconnecting polishing tank outlet system (26), and is collected and transported by pipe (28).

For testing purposes the polished water is then passed through a bag filter (27). The bag filter would not normally be used in a water treatment plant. It was included in the depicted system to assess the effectiveness of the system. In a water treatment plant the water exiting the outlet (29) may then be considered potable or may be subjected to further down stream treatments, such as chlorination or fluoridation. For testing purposes the water from outlet (29) was fed back into the contactor (1).

EXAMPLE 1

The system depicted in FIG. 1 was operated at a 9 m/h upflow rate through the magnetite beds of the polishing tanks (22).

| Run time (h) | Flow Rate m$^3$/h | Bed upflow rate m/h | Bag filter capture mL | Bag filter capture mL/h |
|---|---|---|---|---|
| 0 | 10.25 | 9.71 | | |
| 4 | 10.28 | 9.73 | <1 | 0.25 |
| 8 | 10.15 | 9.61 | 1 | 0.25 |
| 12 | 10.15 | 9.61 | 4 | 1 |
| 16 | 10.24 | 9.70 | 1.5 | 0.35 |
| 21 | 10.38 | 9.83 | 1.5 | 0.3 |
| 25 | 10.17 | 9.63 | 2 | 0.5 |
| 34 | 10.1 | 9.56 | 4 | 0.5 |
| 39.5 | 10.37 | 9.82 | 3.5 | 0.7 |
| 47 | 10.15 | 9.61 | 3 | 0.5 |
| 56 | 10.37 | 9.82 | 4 | 0.4 |
| 63.5 | 10.35 | 9.80 | 2 | 0.4 |
| 79.5 | 10.35 | 9.80 | 2 | 0.1 |
| 89.5 | 10.17 | 9.63 | 2 | 0.2 |
| 96.5 | 10.30 | 9.75 | 3 | 0.3 |
| 104 | 10.30 | 9.75 | 2 | 0.2 |
| 104 hours total | 10.25 m$^3$/h avg | 9.71 m/h avg | 35.5 mL total | 0.4 ml/h avg |

The test was run for 104 hours at an average run time at 10.25 m$^3$/h. This means the system would have treated 1.066 mL of raw water.

The bag filter was examined and found to have captured 35.5 ml of material. This corresponds to 33.3 mL/ML.

The estimated loading on the magnetite bed is 80 mL/h (7.8 L/ML), which corresponds to 8.3 liters of resin. The estimated capture efficiency is 99.57% (8.2645/8.3*100).

EXAMPLE 2

At the end of the Example 1, the flow rate was reduced to 5 m³/h and three of the four magnetite beds were taken off line. This had the effect of increasing the up flow rate through the magnetite beds to 18.9 m/h (5 m³/h/0.264 m²/h). The pilot plant was run at this rate for two and one half hours during which time the bag filter capture was less than 2 mL. It was concluded that the higher up flow rate did not result in the release of the resin fines, portions or particles loaded onto the magnetite beds, which was estimated to be 2.1 kg of magnetic resin material.

EXAMPLE 3

Following on from example 2, the flow rate was increased to 7.55 m³/h, which had the effect of increasing the up flow rate through the beds to 28.4 m/h (7.5 m³/h/0.264 m²/h). The pilot plant was run at this rate for one and one half hours, during which time the bag filter captured less than 2 mL of material. The higher up flow rate had therefore not caused the release of the resin fines and other fragments loaded onto the magnetite beds, which was estimated to be 2.1 kg of resin material.

EXAMPLE 4

Following on from example 3, the flow rate was increased to the highest possible rate of 15.5 m³/h which had the effect of increasing the up flow rate through the filter to 58.7 m/h (15.5 m³/h/0.264 m²/h). The pilot plant was run at this rate for twenty minutes, during which time the bag filter captured 600 mL of material. The higher up flow rate had therefore caused the release of a significant amount of the resin fines, approx 25% of the resin material loaded onto the magnetite beds.

EXAMPLE 5

One of the magnetite beds was dissected to determine where the captured resin material was residing in the bed. 50 mm deep sections of the bed were removed and washed over a 1.5 mm mesh to remove any MIEX® DOC resin material attached to the media. In the top 3 layers i.e. the top 150 mm of the fine media (1.5 to 6 mm magnetite) were found to contain 80 mL of sub 1.5 mm material. This material was mostly magnetite fines and virtually no MIEX® DOC resin was present.

The fourth layer contained 70 mL of material that was sub 1.5 mm, but in this case about 5 mL of the material was MIEX® DOC resin. The remaining media (6 to 10 mm magnetite) was removed as one layer and was found to contain 2150 mL of MIEX® DOC resin.

EXAMPLE 6

High Up Flow Wash with and without Air Sparse 15.25 m³/h was forced through one of the magnetite beds (58 m/h) for 1 hour. During this time 950 mL of resin material was flushed from the bed. Following this, air was added to help remove the remaining resin, which resulted in the removal of a further 1000 mL of resin material.

The magnetite bed material was then manually removed and hand washed. A further 700 mL of material was collected, although quite a lot of this material was magnetite fines (approximately 30%).

It was concluded that 2450 mL resin was in the magnetite bed (2650 mL of sub. 1.5 mm material contained in the filter bed less an estimated 200 mL of magnetite fines). This means that approximately 950 mL removed by 58 m/h water up flow, which corresponds to 39% and 1950 mL removed by air and 58 m/h water upflow, which corresponds to 80%. Higher removal efficiencies are expected with higher water flow rates.

It was noted that the tested air distribution was not ideal which lead to poor resin material removal from the water streams on one side of the magnetite beds. Higher removal efficiencies could be expected with a better air distribution system.

It was also observed that if the water level was dropped below the bed, then a stream of water from a hose directed onto the bed and moved about, effectively washed most of the resin material out.

It was concluded that the use of particulate magnetite provided an effective means for separating magnetic resin fines, portions and particles from the water and the captured resin material could be readily removed from the material by the use of a back washing and sparge system.

It was also concluded that the particulate magnetic material could be used in existing types of sand filtration systems as a replacement or blended or layered with the filtration media to enhance the removal of magnetic resin fines, portions and/or particles.

EXAMPLE 7

A further series of tests were conducted to determine the relationship between maximum upflow rate and the average particle size of the magnetite and the depth of the magnetite bed. The results of the tests are shown in table 2.

Two magnetite media sizes, (1.5 to 6 mm and 6 to 10 mm) were evaluated, in single media fixed beds with bed depths ranging from 50 to 350 mm.

The bed depths used in the 1.5 to 6 mm media trials were 50 and 350 mm. The 50 mm deep bed depth was tested as it was considered to be the shallowest depth that would be likely to be used in application situations, eg. a shallow layer of magnetite placed just below the weirs of a conventional clarifier. The 350 mm bed depth was tested because it would provide data on bed depths likely to be used in retro fitted sand filters.

The bed depths used in the 6 to 10 mm media trials were 50, 100, 150 and 350 mm. The bed depths larger than 100 mm were used to test the resin retaining capacity of magnetite beds comprising larger size particles.

Preliminary trials with the system depicted in FIG. 1, in an arrangement like that used in example 2 (ie a single bed test) resulted in dramatic channelling effects, over the inlet (21) but also around the walls of the polishing tank when shallow beds were tested. The polishing tank and inlet system was modified to even out the flow patterns from the inlet. The other apparatus remained as described in FIG. 1.

The polisher tank was formed from a 205 L drum. The tank included a water inlet at the base of the tank and a water outlet at the top of the tank. Intermediate to the inlet and outlets was located a substantially horizontal plate containing 4 mm holes spaced 30 mm apart. The plate was located 300 mm from the base of the drum. On top of the plate was located 100 mm lengths of 90 mm pipe in an upright arrangement. A 1.5 mm support mesh was located on top of the pipes and the magnetite particles were located on top of the mesh.

The inlet pipe entered the tank through the substantially horizontal base of the tank and the pipe included a substantially right angle bend within the tank. This arrangement resulted in a substantially horizontal flow of water exiting inlet pipe. The arrangement dissipated the force of water by generating a swirling motion in a region between the base of the tank and the holed plate. Passing the water through the 4 mm holes in the plate provided an even upward flow of the water. The water then passed through the vertical pipe sections located on top of the holed plate. The pipes provided vertical baffling to reduce any residual swirl that might be present and also provided a space between the magnetite bed and the plate holes which allowed most of the force of the water jetting through the 4 mm holes to dissipate before entering the magnetite bed.

The same test method was used in each experiment. The method included a pre-wash phase in which the contactor and settler were filled with water, the agitator and recycle pump was then started and the water flow was diverted through the bag filter to retain the carryover resin. The ball valve on the feed line to the contactor (after the magnetic flow meter) was adjusted to achieve a 10 m/h flow rate into the contactor and then water was added to the buffer tank until the system comes into hydraulic balance. MIEX® resin was then added to the contactor (5 pails) and the air lift pump was started (air flow rate 0.6 N m$^3$/h). The bag in the filter was changed as required (when pressure rise is observed). The volume of resin fines captured by the filter after settling for first sample period was then determined, and the process continued until the fines were removed as determined by visibility in the settler, approx. 20 cm visible depth (estimated 6 hours). The conditioned resin was removed and the new resin added and the process continued until sufficient resin for the trial was pre-conditioned, after which the water was drained from the system.

The magnetic trap was assembled by inserting a holed base plate in a 205 liter drum and securing the plate 300 mm from the bottom of the drum. On top of the holed plate was vertically placed fifteen 100 mm long sections of 90 mm pipe and 10*20 mm wire mesh was placed on top of the pipe sections and then 1.5 mm wire mesh on top of the support mesh. The desired amount of the desired magnetite size fraction was poured onto wire mesh and leveled out before the assembled magnetic trap was flooded with water from below. The initial 50 liters (approx) of water were sent to waste as the water contains silica and other turbidity containing material. The magnetite was not re-magnetised between trials.

Each trial was conducted by filling the contactor and settler with water, the agitator and recycle pump was then started and the ball valve on the feed line to the contactor (after the magnetic flow meter) was adjusted to achieve the desired flow rate into the contactor (5 to 14 m$^3$/h). Water was added to the buffer tank until the system comes into hydraulic balance and the pre washed resin was added to the contactor (30 liters). The air lift pump was started and the system allowed to come in to balance. The water flow was then diverted through the magnetic trap and then through the bag filter to retain carry-over resin material. The contactor was sampled to determine the resin concentration and resin was added or removed to achieve the desired resin concentration (12 mL/L). The bag in the filter was changed every 4 to 12 hours (as required) and the volume of resin material captured by the filter after settling for 1 hour was determined. The trial was run for the desired operational period or until resin breakthrough occurs on the magnetic trap after which the system was shut down and the magnetite removed from the magnetic trap and washed over a 1.5 mm screen to determine the volume of resin material that was retained. The remainder of the magnetic trap was removed and cleaned for use in the next trial. The subsequent trials used the same resin as the previous trial with the addition of sufficient fresh pre-wash resin to restore resin inventory.

TABLE 2

Performance of magnetic entrapment using magnetite of various particle sizes and bed depths while operating at various up flow rates.

| Magnetite particle size mm | Depth of magnetite bed mm | up flow rate m/h | loading rate L/ML | bed capacity L/m$^2$ | Removal efficiency % | Product water solids L/ML |
|---|---|---|---|---|---|---|
| 1.5 to 6 | 50 | 21 | 5.4$^a$ | >61 | 94 | 0.321 |
|  |  | 26 | 4.4 | 89 | 86 | 0.394 |
|  |  | 31 | 3.2 | >37 | 87 | 0.406 |
|  |  | 34 | 3.5 | 43 | 91 | 0.304 |
|  |  | 38 | 3.3 | <20 | 95$^b$ | 0.802 |
|  |  | 44 | 6.1 | <13$^c$ | 86$^c$ | 0.84 |
| 1.5 to 6 | 350 | 34 | 5.5 | 58 | 99 | 0.031 |
|  |  | 40 | 4.2 | 36 | 98 | 0.075 |
|  |  | 47 | 6.5 | 25 | 98 | 0.113 |
|  |  | 51 | 4.5 | 21 | 98 | 0.174 |
| 6 to 10 | 50 | 33.3 | 4.4 | 20$^c$ | 81$^c$ | 0.83 |
| 6 to 10 | 100 | 27 | 2.3 | 47 | 77 | 0.541 |
|  |  | 33.3 | 3.1 | 28 | 82 | 0.544 |
|  |  | 38.5 | 4.5 | 0 | 65 | 1.59 |
| 6 to 10 | 150 | 33 | 2.6 | 45 | 84 | 0.399 |
| 6 to 10 | 350 | 33 | 3.4 | 47$^b$ | 88$^b$ | 0.412 |
|  |  | 39 | 4.5 | 14$^c$ | 82$^c$ | 0.805 |

Notes:-
$^a$only one launder was used to increase carryover
$^b$the accuracy was effected by extended post breakthrough run
$^c$the accuracy may be effected by the limited data points It was concluded that the volume of water that could be treated before breakthrough reduced as up flow rate increased. The volume of water that could be treated before breakthrough reduced with reduced bed depth. The reduction in removal efficiency post-breakthrough was more dramatic at high up flow rates.

The same magnetite was used in all the trials and was the same as that used in the earlier examples. The 1.5 to 6 mm magnetite was effectively used for almost a 6 week period, during which time it was manually washed 13 times. The 6 to 10 mm magnetite was also used in the earlier examples, but had been in storage for the 6 week period required to complete the 1.5 to 6 mm trails. When back in service it was effectively used for almost a 4 weeks period, during which time it was manually washed 7 times.

Manual washing causes considerable abrasive action and therefore has the potential to demagnetise the magnetite. Despite this potential, the magnetite retained its magnetism and its performance does not seem to have been diminished.

The new polishing tank/inlet configuration was effective but it was evident that resin material was escaping from the bed near the wall of the polisher. This affected the results obtained for all bed depths and both media sizes, and particularly the shallow bed experiments. The wall effect was more prominent during the shallow bed trials and the larger media trials, however, did not seem to be more problematic at the higher up flow rates than at the lower ones.

It is expected that the influence of the wall effect should be reduced in larger polishing tanks and thus the capture efficiency of shallow beds should increase. It is thought that the wall effects could also be reduced by placing a finer cut of magnetite near the walls of the polishing tank to improve hydraulic resistance through this area and to increase magnetite to vessel wall contact thereby reducing the amount of resin fines and other fragments that bypass the magnetite bed.

This may improve the removal efficiency of shallow beds up to near the levels achieved with the deep beds. The wall effects may also be reduced by changing shape of the wall, such as by the inclusion of flanges. Alternatively a soft seal against the wall could be used to decrease the wall effect.

No resin fines or particles were found to settle out below the magnetite bed at any of the up flow rates used in this example, but this may occur at lower up flow rates. The polisher tank could include a drainage outlet below the holed plate to collect any resin that settles at the base of the tank.

A further design modification may be the combination of the polishing tank with a secondary conical settler. In effect the base of the above polishing tank could be replaced with a conical settler. The system may have two outlets, a polished fluid outflow at the top of the polisher tank portion and a resin bead outflow at the base of the settler portion. Any overflow resin not separated by the first settler could be collected and returned to the contactors.

The results from table 2 are summarised in table 3 below.

TABLE 3

Maximum operation flow rates demonstrated for magnetite beds of various particle sizes and bed depths.

| Magnetite particle size | Depth of magnetite bed | Maximum up flow rate for efficient operation |
| --- | --- | --- |
| 1.5 to 6 mm | 50 mm | 44 m/h |
| 1.5 to 6 mm | 350 mm | 50 m/h |
| 6 to 10 mm | 50 mm | <33 m/h |
| 6 to 10 mm | 100 mm | 33 m/h |
| 6 to 10 mm | 150 mm | 33 m/h |
| 6 to 10 mm | 350 mm | 39 m/h |

Throughout this specification and the claims which may follow, unless the context requires otherwise, the word "comprise", or variations such as "comprises" or "comprising", will be understood to imply the inclusion of a stated integer or group of integers but not the exclusion of any other integer or group of integers.

The invention claimed is:

1. A process for separating magnetic resin portions, particles, fines or combinations thereof from a solution containing the magnetic resin portions, particles, fines or combinations thereof by passing the solution through a bed of particulate permanent magnetic material wherein an electromagnet is not used.

2. The process according to claim 1 wherein the bed of particulate permanent magnetic material is in the form of a column of particulate permanent magnetic material.

3. The process according to claim 2 wherein the particulate permanent magnetic material is magnetite.

4. The process according to claim 2 wherein the column of particulate permanent magnetic material comprises a first layer of particulate permanent magnetic material having a first average particle size and a second layer of particulate permanent magnetic material of a second average particle size different to the average particle size of the first layer.

5. The process according to claim 1 wherein the particulate permanent magnetic material is magnetite.

6. The process according to claim 5 wherein the magnetite has an average particle size between 0.3 to 50 mm.

7. The process according to claim 1 wherein the bed of particulate magnetic material comprises a first layer of particulate permanent magnetic material having a first average particle size and a second layer of particulate permanent magnetic material of a second average particle size different to the average particle size of the first layer.

8. The process according to claim 7 wherein particulate permanent magnetic material of the second layer has an average particle size from 1.5 to 6 mm and the first layer has an average particle size from 6 mm to 10 mm.

9. The process according to claim 8 wherein the particulate permanent magnetic material is magnetite.

10. The process according to claim 1 wherein the process is followed with a step of washing the particulate magnetic material with a wash solution to remove resin portions, particles, fines or combinations thereof retained on the particulate permanent magnetic material.

11. The process according to claim 10 wherein the washing step involves backwashing, sparging or both.

12. The process according to claim 10 wherein materials removed from the particulate permanent magnetic material are recovered from the wash solution.

13. The process according to claim 1 wherein the magnetic resin is magnetic ion exchange resin.

14. A water treatment process comprising contacting raw water with magnetic ion exchange resin in a contactor, separating the contacted water from the resin, and passing the separated water through a bed of particulate permanent magnetic material according to claim 1.

15. The water treatment process of claim 14 wherein the bed of particulate permanent magnetic material is in the form of a column of particulate permanent magnetic material.

16. The water treatment process of claim 14 wherein the contacted water is separated from agglomerated magnetic resin prior to passing the separated water through the bed of particulate permanent magnetic material.

17. A water treatment process comprising contacting raw water with magnetic ion exchange resin in a contactor, separating the contacted water from the resin, and passing the separated water through a bed of particulate permanent magnets according to claim 1.

18. The water treatment process of claim 17 wherein the particular permanent magnets are magnetite.

19. A process for separating magnetic resin portions, particles, fines or combinations thereof from a solution containing the magnetic resin portions, particles, fines or combinations thereof by passing the solution through a bed of particulate permanent magnets.

20. The process of claim 19 wherein the particulate permanent magnets are magnetite.

* * * * *